United States Patent [19]

Blackmon, Jr. et al.

[11] Patent Number: 5,745,071
[45] Date of Patent: Apr. 28, 1998

[54] METHOD AND APPARATUS FOR PRECISELY LOCATING A RESONANT OBJECT

[75] Inventors: James B. Blackmon, Jr., Brownsboro; Jesse C. James, Huntsville, both of Ala.

[73] Assignee: McDonnell Douglas Corporation, St. Louis, Mo.

[21] Appl. No.: 814,037

[22] Filed: Mar. 10, 1997

[51] Int. Cl.$^6$ .................................................. G01S 13/06
[52] U.S. Cl. ............................ 342/90; 342/192; 342/444; 342/445; 342/457; 342/463
[58] Field of Search ........................... 342/90, 192, 193, 342/56, 59, 159, 194, 195, 417, 423, 429, 434, 444, 445, 450, 453, 457, 463, 465

[56] References Cited

U.S. PATENT DOCUMENTS

| | | | |
|---|---|---|---|
| 3,832,709 | 8/1974 | Klein et al. | 342/127 |
| 4,476,459 | 10/1984 | Cooper et al. | 340/572 |
| 4,484,193 | 11/1984 | Bellew | 342/98 |
| 4,490,718 | 12/1984 | Opitz et al. | 342/192 |
| 4,641,137 | 2/1987 | Opitz et al. | 342/192 |
| 4,673,940 | 6/1987 | Barley et al. | 342/192 |
| 4,897,660 | 1/1990 | Gold et al. | 342/192 |
| 5,073,780 | 12/1991 | Barley et al. | 342/45 |
| 5,424,749 | 6/1995 | Richmond | 342/192 |

*Primary Examiner*—John B. Sotomayor
*Attorney, Agent, or Firm*—Bell Seltzer Intellectual Property Group of Alston & Bird LLP

[57] ABSTRACT

The method and apparatus precisely identifies and locates an object which resonates in response to signals of at least one and, more typically, two resonant frequencies. The locating apparatus includes a transmitter for concurrently transmitting signals having a resonant frequency and signals having a non-resonant frequency toward the resonant object. The locating apparatus also includes at least two receivers for receiving reflected signals having the resonant frequency and the non-resonant frequency. The locating apparatus further includes a signal processor for locating the resonant object based upon the reflected signals detected by the receivers. The signal processor has multiple channels, one of which is associated with each receiver, for separately processing the reflected signals received over time by each of the receivers. Within each channel, the signal processor significantly reduces signal clutter based upon respective differences between the reflected signals having the resonant frequency and the reflected signals having the non-resonant frequency which were received by the respective receiver. By reducing signal clutter in the received signals, the locating apparatus identifies and locates the resonant object with more precision.

22 Claims, 5 Drawing Sheets

METHOD AND APPARATUS FOR PRECISELY LOCATING A RESONANT OBJECT

TECHNICAL FIELD

The present invention relates generally to a method and apparatus for locating a resonant object and, more particularly, to a method and apparatus for precisely locating a resonant object by reducing signal clutter.

BACKGROUND ART

It is oftentimes desirable to identify and locate objects which are remote or are visibly obscured. By identifying and locating objects which cannot be seen, a region can be electronically scouted in a safe and effective manner. For example, it would be desirable during battle to identify and locate a variety of objects, such as tanks, antennas and vehicles, located out of sight in enemy territory.

While a variety of radar systems have been developed to detect remotely located objects, conventional radar systems have not generally been optimized to detect specific types of objects which are known to resonant at one or more predetermined frequencies, i.e., one or more resonant frequencies. As a result, the reflected signals received and processed by these conventional radar systems are typically cluttered with signals which have reflected from conductors, dielectric bodies and lossy objects, other than the resonant object of particular interest. For example, pulse radar systems which transmit extremely short pulses, such as pulses having a duration of 1 ns or less, introduce frequency components spread over approximately 1 GHz. As a result, the reflected signals elicited by such an extremely short pulse include reflections from a great many objects in addition to the resonant object of interest. In addition, pulse radar systems which transmit extremely short pulses also produce reflected signals having a relatively poor signal-to-noise ratio since the short pulses do not provide the objects with much energy.

By transmitting signals which elicit a large number of reflected signals from many objects in addition to the resonant object of interest, it is difficult, if not impossible, to accurately identify and locate the resonant object of interest. As a result, the resonant object may not be identified and/or may not be located. Even worse, the resonant object may be improperly identified and/or improperly located. Thus, even though a wide variety of radar systems have been developed to identify remotely-located objects, these conventional radar systems have not been optimized to precisely identify and locate particular types of resonant objects in a safe and reliable manner.

DISCLOSURE OF INVENTION

According to the present invention, a method and apparatus is provided for locating an object which resonates in response to signals of at least one resonant frequency. By processing the signals reflected by the resonant object according to the present invention, the signal clutter in the reflected signals is significantly reduced such that the resonant object can be more precisely identified and located.

The locating apparatus of the present invention includes a transmitter for concurrently transmitting signals having a resonant frequency and signals having a non-resonant frequency toward the resonant object. The locating apparatus also includes at least two receivers for receiving reflected signals having the resonant frequency and the non-resonant frequency. According to one advantageous embodiment, the locating apparatus also includes a third receiver co-located with the transmitter for receiving reflected signals having the resonant frequency and the non-resonant frequency.

The locating apparatus of the present invention further includes a signal processor for locating the resonant object based upon the reflected signals detected by the receivers. The signal processor preferably has multiple channels, one of which is associated with each receiver for separately processing the reflected signals received over time by each of the receivers. As described below, the signal processor includes means for reducing signal clutter based upon respective differences between the reflected signals having the resonant frequency and the reflected signals having the non-resonant frequency received by each of the receivers. By reducing signal clutter in the received signals, the method and apparatus of the present invention identifies and locates the resonant object with more precision.

According to one advantageous embodiment, the resonant object resonates in response to signals having first and second resonant frequencies. Therefore, the transmitter of this embodiment preferably transmits signals having the first and second resonant frequencies and a non-resonant frequency toward the resonant object. In addition, each receiver of this embodiment is adapted to receive reflected signals having the first and second resonant frequencies and the non-resonant frequency.

Each channel of the signal processor of this advantageous embodiment preferably includes a comparator for comparing the reflected signals having the first and second resonant frequencies which were received by the respective receiver to select the signal having the smaller magnitude of the two. Each channel of the signal processor also includes difference means for reducing the signal having the smaller magnitude by an amount related to the magnitude of the reflected signal having a non-resonant frequency to thereby create an intensity signal having reduced signal clutter. Each channel of the signal processor further includes arc generation means for generating an arc in response to the creation of the intensity signal. Each arc has at least one point representative of a location at which the signals having the first and second resonant frequencies were reflected. In addition, each arc is spaced from the respective receiver by a distance relating to the time delay between signal transmission and signal reception. As a result, the resonant object can be located at the intersection of the respective arcs generated by the arc generation means of each of the channels.

For example, the arc generation means of each channel of the signal processor preferably includes a plotter for generating a series of respective arcs based upon signals received by the respective receiver over time. More particularly, in response to the reflected signals received over time at locations spaced apart from the transmitter by the first and second receivers, the respective arc generation means of the first and second channels of the signal processor generate a series of elliptical arcs. In addition, the arc generation means of the third channel which separately processes the reflected signals received by the third receiver, co-located with the transmitter, generates a series of circular arcs.

Alternatively, the signal processor can solve the $n^{th}$-order algebraic equation with n unknown terms which describes the time delay between signal transmission and reception for signals having resonant and non-resonant frequencies in order to locate the resonant object. This approach is typically preferred when locating objects which do not lie approximately in the same plane as the transmitter and/or receivers. For example, this approach is employed to locate objects in hilly terrain or to locate objects with a non-ground based transmitter and/or non-ground based receiving systems, such as those mounted in an aircraft.

In order to further ensure that the resonant object is not incorrectly identified, each channel of the signal processor of either embodiment can include a threshold comparator for comparing the magnitude of the intensity signal to a predetermined threshold. The predetermined threshold is representative of the minimum acceptable magnitude of an intensity signal. As a result, the arc generation means of this embodiment will not generate an arc based upon an intensity signal having a magnitude less than the predetermined threshold since the reflected signals having the resonant frequency are not significantly greater than the reflected signals having the non-resonant frequency. Thus, the precision with which the resonant object is identified and located is further enhanced according to this advantageous embodiment.

Accordingly, the method and apparatus of the present invention increases the precision with which resonant objects are identified and located. For example, the locating method and apparatus reduces signal clutter by transmitting, receiving and processing not only signals having a resonant frequency which are utilized to identify the resonant object, but also signals having a non-resonant frequency which provide information relating to the signal clutter present in all of the reflected signals, including the signals having a resonant frequency. In addition, for objects having at least two resonant frequencies, the locating method and apparatus preferably transmits, receives and processes signals having both the first and second resonant frequencies, thereby further increasing the precision with which the resonant object is identified. Finally, the locating method and apparatus detects the reflected signals with two or more receivers such that by separately processing the signals received by each of the receivers, the identification and location of the resonant object can be further refined. As a result, the locating method and apparatus of the present invention precisely identifies and locates resonant objects in a manner which significantly reduces the risk of improperly identifying and/or improperly locating the resonant object.

BEST MODE(S) FOR CARRYING OUT THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
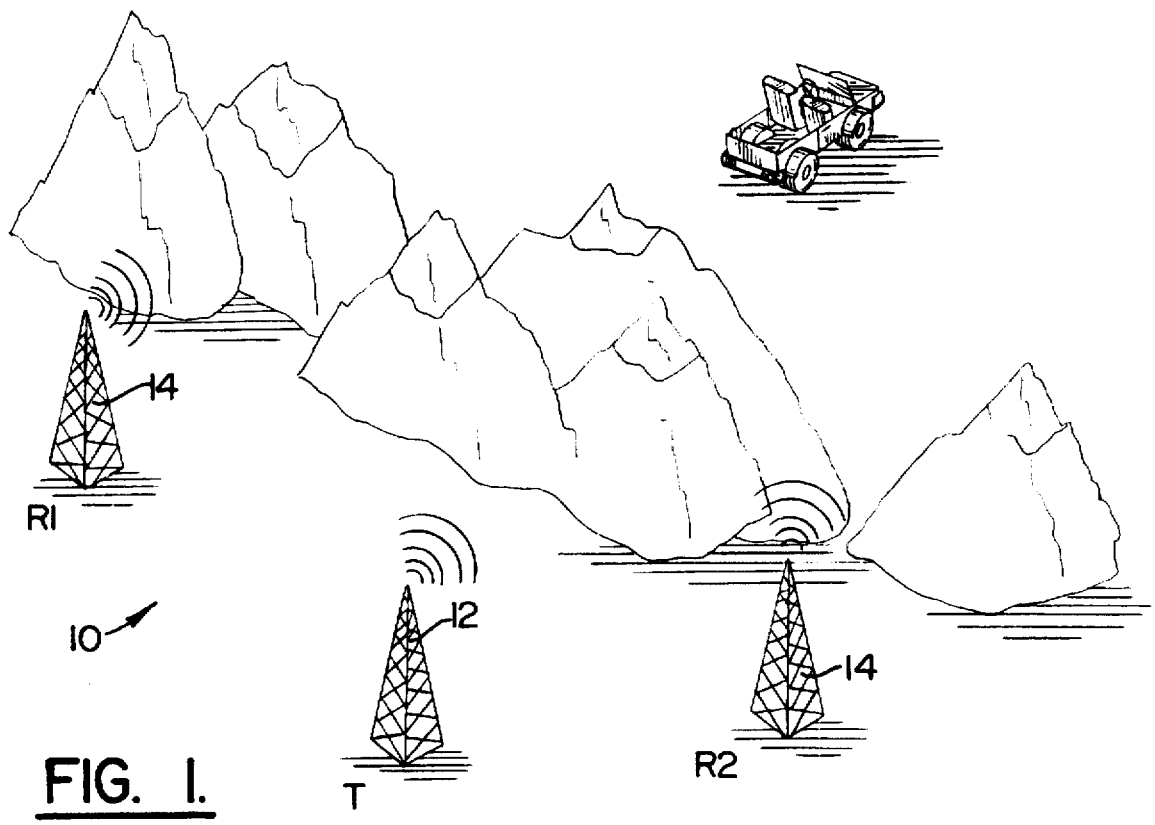
FIG. 1 is an environmental view of a locating apparatus according to one embodiment of the present invention which includes a transmitter and first and second receivers for identifying and locating a remotely located, resonant object, such as a tank.
Figure 2:
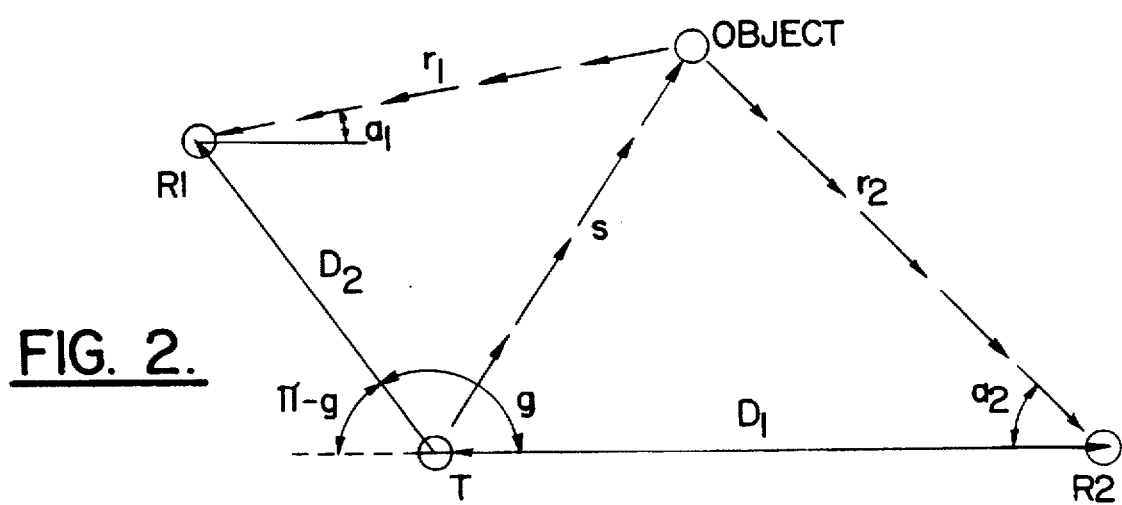
FIG. 2 is a diagram identifying the relative distances between the transmitter, the receivers and the resonant object.

Referring now to FIG. 1, an apparatus 10 for locating a resonant object according to one embodiment to the present invention is illustrated. As shown, the locating apparatus includes a transmitter 12 and first and second receivers 14 spaced apart from the transmitter and from each other. While the transmitter and receivers can be arranged in a variety of different configurations and can be spaced apart by different distances, the first and second receivers of one advantageous embodiment are positioned on opposite sides of the transmitter and are spaced from the transmitter by different distances. As shown in FIG. 2, for example, the first and second receivers of one embodiment are spaced from the transmitter by respective separation distances $D_2$ and $D_1$ of between 100 meters and 1000 meters and define an angle g relative to the transmitter of about 135°. In addition, for greater accuracy, it has been determined that the first and second receiver should be positioned such that angles $a_1$ and $a_2$ (see FIG. 2) are different. The positioning of the equipment, i.e., the transmitter and the receivers, is significant since the accuracy with which the location of a resonant object can be determined is largely dependent upon the accuracy with which the equipment is positioned for pulse lengths of less than 100 ns.

While the locating apparatus 10 of the present invention need only include two receivers 14, the locating apparatus can include one or more additional receivers without departing from the spirit and scope of the present invention. In fact, the locating apparatus can oftentimes locate a resonant object more precisely with three or more receivers. Accordingly, the locating apparatus can include a third receiver co-located with the transmitter 12.

The locating apparatus 10 of the present invention is designed to identify and locate an object which resonates in response to signals of at least one resonant frequency and, more preferably, signals having first and second resonant frequencies. Typically, the resonant frequencies at which the object resonants are predetermined. For example, the resonant frequencies of a vehicle or tank will generally be known in advance. In addition, the resonance of a gun barrel or antenna will also generally be known. Accordingly, the transmitter 12 can be configured to transmit signals having at least one and, more preferably, two resonant frequencies selected to match the resonant frequencies of the object of interest. While the locating method and apparatus of the present invention is primarily described in conjunction with the identification and location of military-type targets, it will be apparent that the locating method and apparatus can be utilized to locate a wide variety of other types of resonant objects both above and below ground.

The transmitter 12 also transmits signals having a non-resonant frequency. The non-resonant frequency is preferably selected to be near a resonant frequency. For example, the transmitter of one advantageous embodiment also transmits a signal having a non-resonant frequency selected so that the echo intensity is 3 to 6 decibels less than the intensity of the weaker resonance.

For a locating apparatus designed to detect an object which resonates at 50 MHz and 150 MHz, the transmitter 12 preferably transmits signals having first and second resonant frequencies of 50 MHz and 150 MHz, respectively, and a non-resonant frequency of 100 MHz. However, the transmitter can transmit signals having other frequencies in order to detect other types of resonant objects, as described above, without departing from the spirit and scope of the present invention.

Typically, the transmitter 12 simultaneously transmits pulses which include signals at each of the resonant frequencies and the non-resonant frequency. For example, a transmitter that transmits signals having the first and second resonant frequencies and a non-resonant frequency will transmit three concurrent pulses of equal duration which include signals having the first and second resonant frequencies and the non-resonant frequency, respectively.

The transmitter 12 and receivers 14, including the receiver co-located with the transmitter, can include a variety of antennas. According to one embodiment, however, the transmitter and receivers include linearly-polarized antennas having a beamwidth of less than 45°. In addition, the third receiver co-located with the transmitter can utilize the same antenna as the transmitter since the reflected signals will be delayed by various lengths of time $t_d$ following signal transmission.

As known to those skilled in the art, however, the selection of appropriate antennas is driven by a number of factors. For example, while the maximum range of an antenna will increase as the size of the antenna increases, the angle of coverage of the antenna will correspondingly decrease. In addition, the size of the antenna aperture having a given beam width will vary greatly as the signal frequency varies. For example, the antenna aperture of an antenna which covers an angle of 30°–40° is approximately 5 square meters at a frequency of 250 MHz, but is approximately 0.05 square meters at a frequency of 2500 MHz. Accordingly, the size of the antenna should be selected based upon the desired range of the antenna and the frequency of the signals transmitted by the antenna.

The sensitivity of an antenna is also significantly affected by the duration of the signal pulses transmitted and received by the antenna. While short pulses offer good resolution, short pulses have a large bandwidth which may include signals at several resonant frequencies. According to one embodiment, however, it has been determined that signals having a frequency below 1000 MHz should preferably have a pulse length of approximately 100 nanoseconds, while signals having frequencies of greater than 1000 MHz should preferably have a pulse length of approximately 10 nanoseconds. However, other pulse lengths can be transmitted and received without departing from the spirit and scope of the present invention.

For signals having the preferred pulse lengths described above and for an antenna configured to have a maximum range of about 300 meters, the required peak power for each pulse will range from approximately 250 watts for signals having a frequency of 250 MHz to approximately 250 kilowatts for signals having a frequency of 2500 MHz. Since the pulse length is small and the frequency of transmission is low, however, the prime power required by the antennas is also small. For example, an automobile storage battery can power the transmitter 12 for several days when the transmitter is pulsed no more than 10 pulses per hour. In addition, the power required by the locating apparatus 10 of the present invention is typically further reduced since the transmitter preferably only transmits a limited number of pulses, such as two or three pulses, in order to reduce the risk that the transmissions will be detected by others.

In order to further reduce the prime power required by a transmitter 12 designed to transmit signals having frequencies of approximately 2500 MHz, the transmitter can include a large antenna which can transmit pulses in each of several directions in order to provide the desired angular coverage. In addition, if the first and second resonant frequencies differ greatly, the transmitter and receivers 14 can each include more than one antenna or can include a wideband antenna.

Regardless of the antenna configuration, the transmitter 12 concurrently transmits pulses having a non-resonant frequency and at least one resonant frequency and, more preferably, first and second resonant frequencies toward the resonant object. Following reflection of the signal pulses from various objects, including the resonant object, the receivers 14 will detect the reflected signals having the resonant frequencies and the non-resonant frequency. By appropriately processing the received signals as described hereinbelow, the resonant object can be precisely identified and located.

Although the reflected signals can be at least partially processed at each of the receivers 14, the locating apparatus 10 preferably includes a central signal processor 20 for receiving the reflected signals detected by each of the receivers and for processing the reflected signals in the manner described below. The signal processor is typically centrally located at or near the transmitter 12. However, the signal processor can be positioned in other locations without departing from the spirit and scope of the present invention. While the receivers can communicate with the signal processor by radio, the receivers preferably communicate with the signal processor via electrical cabling, such as coaxial cables, in order to reduce the possibility of detection by others. As known to those skilled in the art, the reflected signals detected by a receiver are typically converted to an intermediate frequency prior to further processing.

The distance $r_i$ of the resonant object from a receiver 14 can be ascertained from the time delay $t_d$ between signal transmission and signal reception since $r_i+s=Ct_d$ wherein C is the velocity of the signals and s is the distance between the transmitter 12 and the resonant object. Therefore, the time at which each of the reflected signals is received is also determined.

Since the time at which the signals were transmitted is also known, the time delay $t_d$ from signal transmission to signal reception and, consequently, the distance $r_i$ from the receiver to the resonant object can be readily determined. In order to identify more than one resonant object located at various, remote locations, the receivers preferably detect reflected signals over a period of time such that multiple reflections can be detected.

Figure 3:
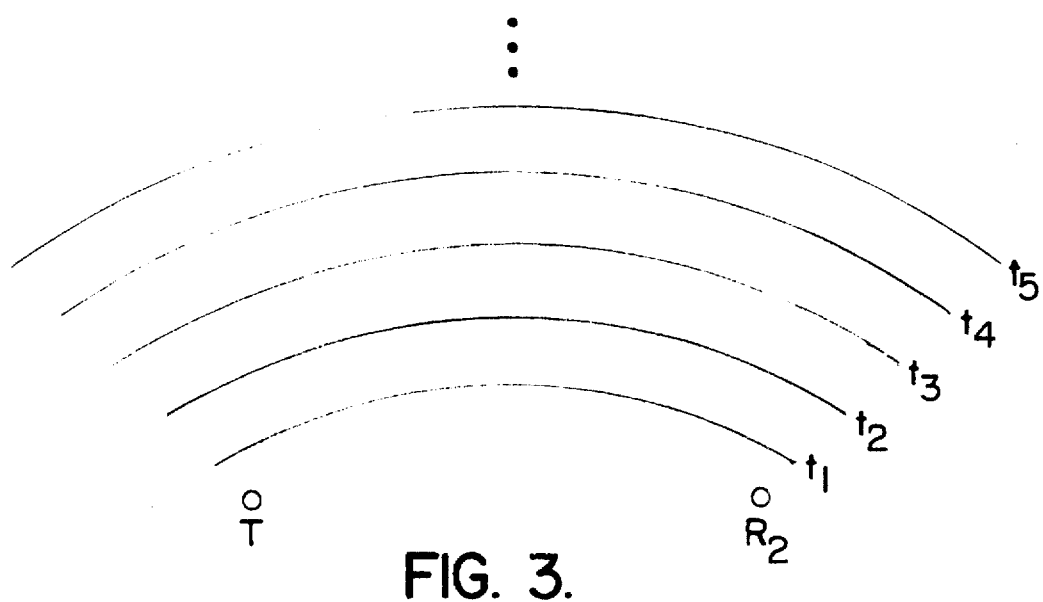
FIG. 3 is a schematic view illustrating a series of elliptical arcs which define the reception patterns, over time, of a receiver R2 which is spaced from the transmitter T.

At a particular instant in time following signal transmission, a receiver 14 which is spaced apart from the transmitter 12 will detect signals which have reflected from any of the points along an ellipse having the transmitter and the receiver at the foci thereof. Since the transmitter and receiver are located at the foci of the ellipse, the distance traveled by any signal which has been transmitted by the transmitter, reflected from an object located along the ellipse and received by the receiver will be identical and, therefore, will be received at the same time. Since signals having a greater delay between signal transmission and signal reception will have traveled a greater distance, the reception pattern of a receiver over time will be defined by a number of ellipses which increase in size as the time delay $t_d$ from signal transmission to signal reception increases. As shown in FIG. 3 with respect to the R2 receiver, the reception pattern of a receiver will typically be defined not by a number of complete ellipses, but by a number of elliptical arcs extending toward the resonant object due to the directives of the respective antennas.

With reference to FIG. 2 in which the transmitter T is located at the origin (0,0) of the coordinate system, the ellipses which define the reception pattern of the R2 receiver at different instances of time t can be defined in terms of (x,y) coordinates as follows:

$$y = \sqrt{\left(1 - \frac{(x - (D_1/2))^2}{(A/2)^2}\right)((A/2)^2 - (D_1/2)^2)} \quad (1)$$

wherein $A = D_1 + 0.5Ct$, C is the velocity of light, and t is the time delay between the time $t_o$ at which the original signal transmitted by the transmitter is received by the respective receiver and the time $t_d$ at which the reflected signals are received by the receiver, i.e., $t = t_d - t_o$. In addition, $D_1$ is the separation distance of the foci, i.e., the separation distance between the R2 receiver and the transmitter T.

Likewise, the ellipses which define the reception pattern of the R1 receiver at different instances of time t can also be defined in terms of (x,y) coordinates as follows:

$$y = \frac{-V + \sqrt{V^2 - 4RK}}{2R} \quad (2)$$

wherein $B = D_2 + 0.5Ct$, $D_2$ is the separation distance of the foci, i.e., the separation distance between the R1 receiver and the transmitter T, and g is the angle defined between the major axes of the two sets of ellipses defined by equations 1 and 2.

In addition, the term V of equation 2 is defined as follows:

$$V = Sx - \frac{D_2 \sin(g)}{(B/2)^2} \quad (3)$$

wherein $$S = \frac{2\sin(g)\cos(g)}{(B/2)^2} - \frac{2\sin(g)\cos(g)}{(B/2)^2 - (D_2/2)^2} \quad (4)$$

Further, the terms R and K of equation 2 are defined as follows:

$$R = \frac{\sin^2(g)}{(B/2)^2} + \frac{\cos^2(g)}{(B/2)^2 - (D_2/2)^2} \quad (5)$$

$$K = \frac{x^2 \cos^2(g) - xD_2\cos(g) + (D_2/2)^2}{(B/2)^2} + \frac{x^2 \sin^2(g)}{(B/2)^2 - (D_2/2)^2} - 1 \quad (6)$$

With respect to the third receiver co-located with the transmitter 12, signals will be received which have reflected from any of the points along a circle centered about the third receiver. Since signals having a greater delay between signal transmission and signal reception will have traveled a greater distance, the reception pattern of the third receiver over time will be defined by a number of circles which increase in size as the time delay from signal transmission to signal reception increases.

In particular, the circular arcs which define the reception pattern of the third receiver at different instances of time t can be defined in terms of (x,y) coordinates as follows:

$$y = \sqrt{0.25C^2t^2 - x^2} \quad (7)$$

wherein t is measured from the time of signal transmission for the receiver co-located with the transmitter 12.

In order to expedite processing of the received signals, the signal processor 20 or a memory device 22 associated with the signal processor can include a database associated with each receiver 14 which identifies the (x,y) coordinates of a number of arcs along which signals which are received at different times following signal transmission would have been reflected. Thus, the database associated with each receiver effectively defines the series of elliptical or circular arcs along which signals which are received by the respective receiver with different amounts of time delay following signal transmission would have been reflected.

Figure 5:
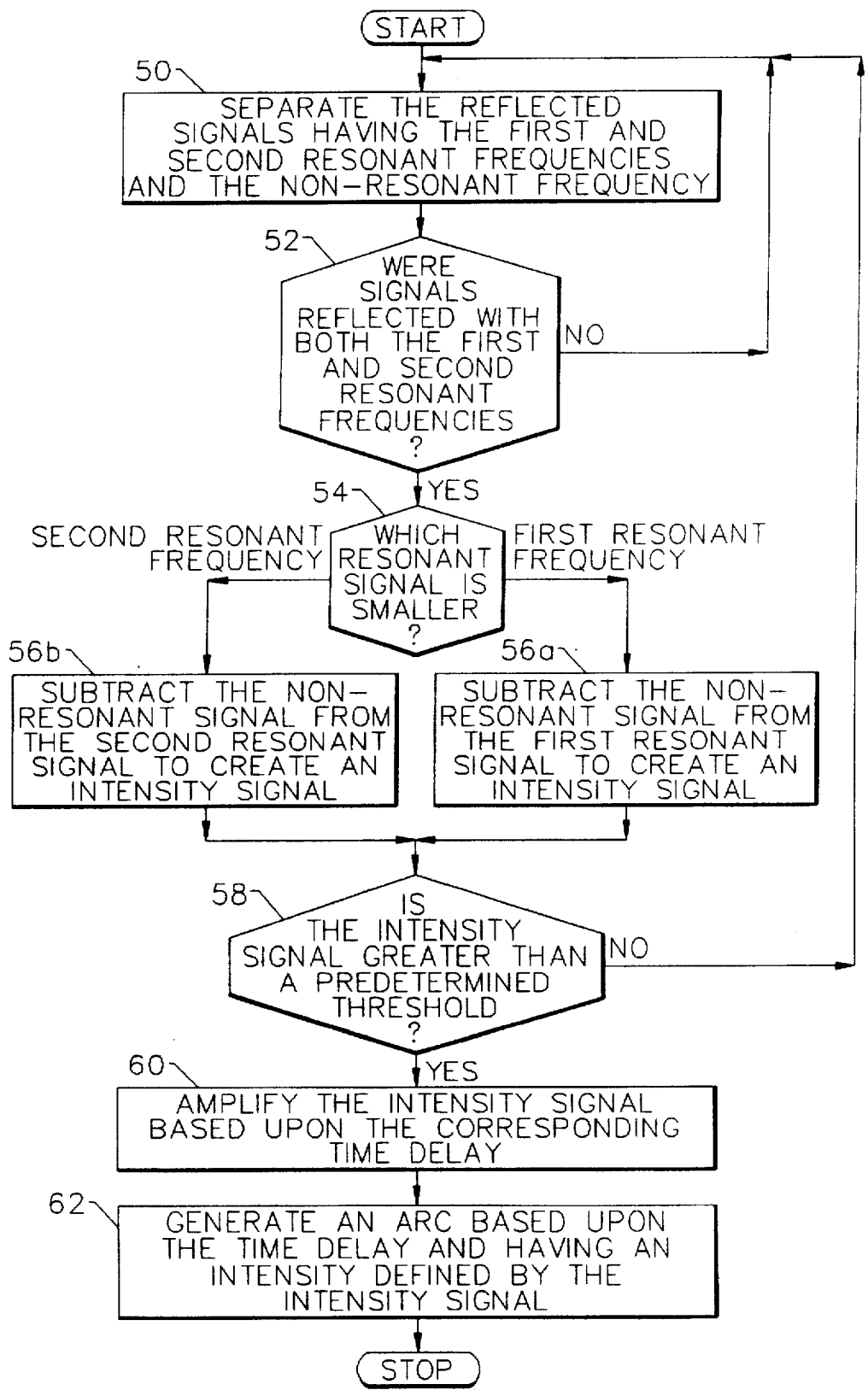
FIG. 5 is a block diagram illustrating the operations performed by the method and apparatus of one advantageous embodiment of the present invention.

As illustrated in FIG. 5 and as described hereinbelow, the resonant object can be precisely identified and located based upon the reflected signals received by each of the receivers 14. In particular, the signal processor 20 preferably includes a number of parallel channels 20a, 20b and 20c, one of which is associated with each respective receiver in order to separately process the reflected signals received over time by the respective receiver. Each channel preferably operates under control of a controller 21 typically implemented by a combination of software and hardware, such as one or more microprocessors or microcontrollers, for performing the various functions described hereinbelow.

Figure 4:
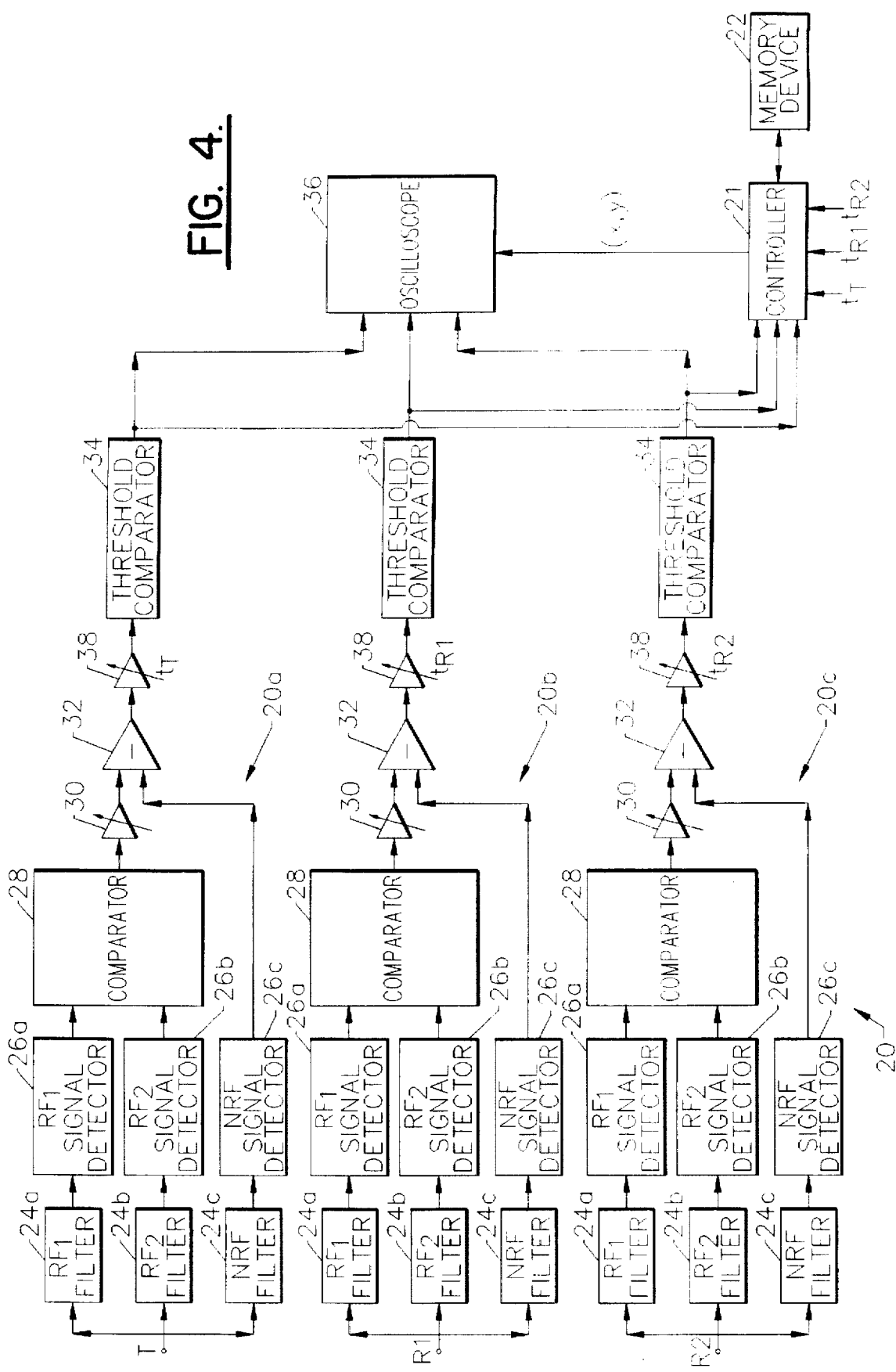
FIG. 4 is a block diagram of a signal processor according to one embodiment of the present invention.

As shown in FIG. 4, each channel of the signal processor 20 includes three passband filters 24a, 24b and 24c to separate the reflected signals having the first and second resonant frequencies and the non-resonant frequency. See block 50 of FIG. 5. In addition, each channel of the signal processor includes one or more signal detectors 26a, 26b and 26c, downstream of each filter, to detect signals of the respective frequency. Based upon the output of the signal detectors, each channel of the signal processor determines if the reflected signals include signals having each of the resonant frequencies transmitted by the transmitter 12, such as the first and second resonant frequencies as shown in Block 52 of FIG. 5. If the reflected signals do not include each of the resonant frequencies transmitted by the transmitter, the signal processor does not further process the signals since the reflected signals did not necessarily reflect from the resonant object of interest.

If the reflected signals do include each of the resonant frequencies transmitted by the transmitter 12, the signal processor 20 and, more particularly, a comparator 28 compares the reflected signals having the first and second resonant frequencies to identify the signal having a smaller magnitude. See block 54 of FIG. 5. The gain or magnitude of the signal having the smaller magnitude can then be adjusted, such as by a first variable gain amplifier 30, in order to optimize performance. Each channel of the signal processor can also include difference means 32, such as a difference circuit, for reducing the signal having the smaller magnitude by an amount related to the magnitude of the reflected signal having the non-resonant frequency. Preferably, the difference circuit reduces the signal having the smaller magnitude by an amount equal to the magnitude of the reflected signal having the non-resonant frequency. See blocks 56a and 56b of FIG. 5. As a result, the difference means creates an intensity signal having reduced signal clutter since the contributions to the reflected signal having a resonant frequency which are due to noise or reflections from objects other than the resonant object are effectively eliminated by reducing the resonant signal having the smaller magnitude by an amount equal to the magnitude of the non-resonant signal.

Each channel of the signal processor 20 also preferably includes a threshold comparator 34. The threshold comparator compares the magnitude of the intensity signal to a predetermined threshold, as shown in block 58 of FIG. 5. The predetermined threshold is representative of the minimum acceptable magnitude of the intensity signal. If the magnitude of the intensity signal is less than the predetermined threshold, the signal processor preferably does not further process the reflected signals since the reflected signals having the resonant frequency are not significantly larger in magnitude than the reflected signals having the non-resonant frequency.

If the magnitude of the intensity signal is greater than the predetermined threshold, however, the signal processor 20 and, more typically, the controller 21 accesses the database 22 associated with the respective receiver 14 to determine the coordinates of the arc, such as an elliptical or circular arc, along which the reflected signals which are currently being processed would have been reflected. As described above, the arc along which the reflected signals would have been reflected is dependent upon the time delay between signal transmission and signal reception. As a result, the signal processor selects the appropriate arc based upon the time delay between the signal transmission and signal reception of the reflected signals currently being processed, i.e., $t_T$ for the receiver co-located with the transmitter, $t_{R1}$ for the R1 receiver and $t_{R2}$ for the R2 receiver.

Each channel of the signal processor 20 also includes arc generation means for generating an arc in response to the creation of the intensity signal. See block 62 of FIG. 5. As described above, the arc has at least one point representative of a location at which the signals having first and second resonant frequencies were reflected. In addition, the arc is spaced from the respective receiver 14 by a distance relating to the time between the signal transmission and the signal reception. For example, the arc generation means can include a plotter 36, such as a multi-channel oscilloscope, for plotting the arc defined by the database 22 associated with the respective receiver for reflected signals having a particular time delay between signal transmission and signal reception. In addition, the signal processor and, more advantageously, the plotter preferably includes memory for storing the coordinates and the corresponding intensity of the arcs plotted by the arc generation means to thereby permit subsequent analysis of the reflected signals.

The intensity of the arc plotted by the arc generation means is typically based upon the magnitude of the intensity signal. In this regard, each channel of the signal processor 20 can include a second variable gain amplifier 38 which controllably adjusts the magnitude of the intensity signal. As shown in FIG. 4, the magnitude of the intensity signal is preferably adjusted upstream of or prior to comparing the intensity signal with a predetermined threshold. For example, the gain provided by the second variable gain amplifier is typically increased as the time delay between signal transmission and signal reception increases such that the intensity of each arc is proportional to its cross-section, i.e., proportional to its apparent size. In particular, the gain of the second variable gain amplifier can be adjusted to be proportional to the square of the time delay. See block 60 of FIG. 5. As a result, an intensity signal based upon reflected signals received after a 2 second delay will be amplified four times more than an intensity signal based upon reflected signals received after a 1 second delay.

Figure 6:
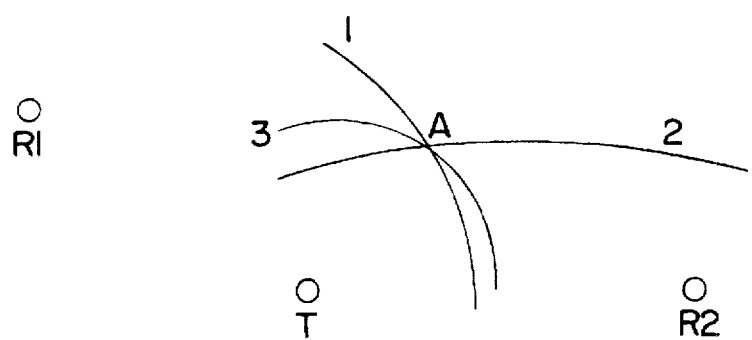
FIG. 6 is an exemplary plot of the elliptical and circular arcs generated according to one embodiment of the present invention to represent the reception patterns of the respective receivers and which intersect at A to define the location of the resonant object.

The arcs plotted by the arc generation means of each channel are preferably overlaid, such as upon the screen of an oscilloscope 36. By studying the resulting plot, the signal processor 20 or the operator of the locating apparatus 10 can locate the resonant object at an intersection of the respective arcs generated by the arc generation means of each of the channels of the signal processor. For example, FIG. 6 illustrates a plot of three arcs which identifies a resonant object at point A, that is, the intersection point of the three arcs. As will be apparent, the arc designated 1 is based upon signals received by the R1 receiver, the arc designated 2 is based upon signals received by the R2 receiver, and the arc designated 3 is based upon signals received by the third receiver co-located with the transmitter T.

Figure 7:
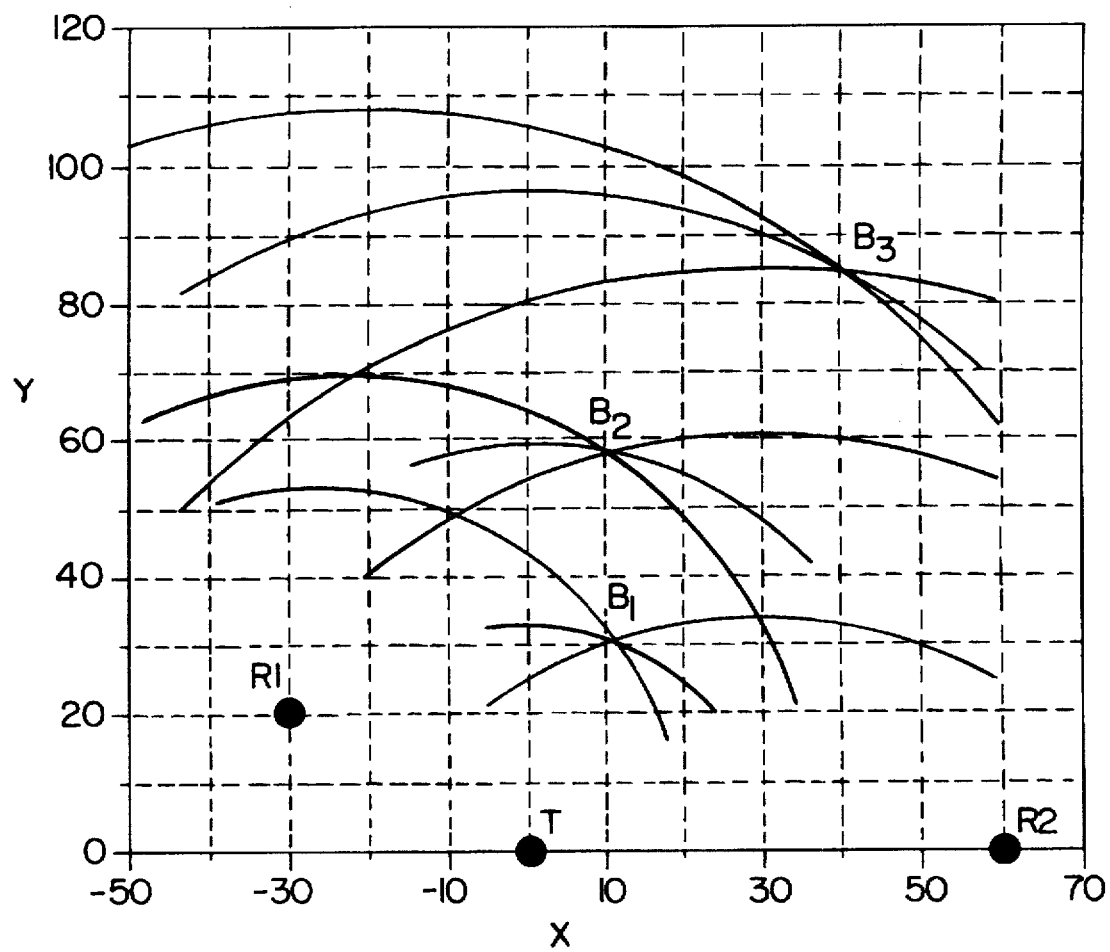
FIG. 7 is another exemplary plot of a number of elliptical and circular arcs representing the reception patterns of the respective receivers over time and which identify intersect at three points designated $B_1$, $B_2$ and $B_3$ to define the relative locations of three different resonant objects.

Another exemplary plot is illustrated in FIG. 7 in which multiple arcs are plotted for each of the three receivers 14 based upon reflected signals received by the respective receivers following different time delays between signal transmission and signal reception. In this exemplary plot, three resonant objects can be identified at the intersection points $B_1$, $B_2$ and $B_3$ of the respective arcs associated with each of the receivers.

By appropriately scaling the plot to correlate time delay to distance, the location of the resonant objects can be precisely defined. For example, the plot shown in FIG. 7 provides the location of the resonant objects relative to the transmitter which is located at the origin (0,0) of the coordinate system. In this regard, the first resonant object $B_1$ is located at (10,30), the second resonant object $B_2$ is located at (10,58) and a third resonant object $B_3$ is located at (42,84).

While the relative locations can be provided by a grid or map overlaid upon the plot of the arcs provided by the signal processor 20, the respective positions of the resonant objects can be located in other fashions without departing from the spirit and scope of the present invention. For example, the signal processor can mathematically determine the relative locations of the resonant objects based upon the intersection of the arcs and can provide a printout or other report of the location of the resonant objects or can electronically provide the respective locations of the resonant objects to personnel in the field. While the relative location of a resonant object which lies in approximately the same plane as the transmitter 12 and the receivers 14 can readily be determined by plotting arcs as described above, it may be advantageous for the signal processor to mathematically determine the relative location of the resonant object in instances in which the resonant object and the transmitter and/or the receivers lie in different planes. For example, the terrain may be hilly or the transmitter and/or the receivers may be airborne. In this case, the above-described two-dimensional equations relating to the time delay between signal transmission and reception would preferably be extended to three dimensions. Thereafter, the signal processor would solve the three-dimensional equation to determine the relative location of the resonant object.

Accordingly, the method and apparatus 10 of the present invention increases the precision with which resonant objects are identified and located. For example, the locating method and apparatus reduces signal clutter by transmitting, receiving and processing not only signals having a resonant frequency which are utilized to identify the resonant object, but also signals having a non-resonant frequency which provide information relating to the signal clutter in all of the reflected signals, including the signals having a resonant frequency. In addition, for objects having at least two resonant frequencies, the locating method and apparatus preferably transmits, receives and processes signals having both the first and second resonant frequencies, thereby further increasing the precision with which the resonant object is identified. Finally, the locating method and apparatus detects the reflected signals with two or more receivers 14 such that by appropriately and separately processing the signals received by each of the receivers, the identification and location of the resonant object can be further defined. As a result, the method and apparatus of the present invention precisely identifies and locates resonant objects in a manner which significantly reduces the risk of improperly identifying and/or improperly locating the resonant object.

Many modifications and other embodiments of the present invention will come to the mind of one skilled in the art to which this invention pertains having the benefit of the teachings presented in the foregoing description and the associated drawings. Therefore, it is to be understood that the invention is not limited to the specific embodiments disclosed and other embodiments are intended to be included within the scope of the appended claims. Although specific terms have been employed herein, they are used in a generic and descriptive sense only and not for purposes of limitation.

That which is claimed is:

1. An apparatus for locating an object which resonates in response to signals of at least one resonant frequency, the apparatus comprising:
    a transmitter for concurrently transmitting first signals having a resonant frequency and second signals having a non-resonant frequency toward the resonant object;
    first and second receivers for receiving reflected signals having the resonant frequency and the non-resonant frequency; and
    a signal processor, responsive to said receivers, for locating the resonant object based upon the reflected signals received by said receivers, wherein said signal processor comprises means for reducing signal clutter based upon respective differences between the reflected signals having the resonant frequency and the reflected signals having the non-resonant frequency received by each of said receivers to thereby more precisely locate the resonant object.

2. An apparatus according to claim 1 wherein the resonant object resonates in response to signals having first and second resonant frequencies, wherein said transmitter concurrently transmits signals having the first and second resonant frequencies and the non-resonant frequency toward the resonant object, wherein said first and second receivers receive reflected signals having the first and second resonant frequencies and the non-resonant frequency, and wherein said means for reducing signal clutter comprises reducing the smaller of the reflected signals having the first and second resonant frequencies by the magnitude of the reflected signal having the non-resonant frequency.

3. An apparatus according to claim 1 further comprising a third receiver co-located with said transmitter for receiving reflected signals having the resonant frequency and the non-resonant frequency.

4. An apparatus according to claim 3 wherein each of said receivers receive reflected signals over time, and wherein said signal processor further comprises arc generation means for generating a respective series of arcs for each of said receivers based upon the signals received by said receivers over time, wherein each arc has at least one point representative of a location at which the received signals were reflected such that the resonant object is located at an intersection of the respective arcs generated for each of said receivers.

5. An apparatus according to claim 4 wherein said arc generation means generates a series of elliptical arcs for each of said first and second receivers, wherein said arc generation means generates a series of circular arcs for said third receiver, and wherein the series of elliptical arcs and circular arcs are spaced further from the respective receivers as the time between signal transmission and signal reception increases.

6. A method for locating an object which resonates in response to signals of at least one resonant frequency, the method comprising the steps of:
    concurrently transmitting first signals having a resonant frequency and second signals having a non-resonant frequency toward the resonant object;
    receiving reflected signals having the resonant frequency and the non-resonant frequency at each of at least two spaced apart receiving locations following said transmitting step; and
    locating the resonant object based upon the reflected signals, wherein said locating step comprises a step of reducing signal clutter based upon respective differences between the reflected signals having the resonant frequency and the reflected signals having the non-resonant frequency received at each of the receiving locations to thereby more precisely locate the resonant object.

7. A method according to claim 6 wherein the resonant object resonates in response to signals having first and second resonant frequencies, wherein said transmitting step comprises concurrently transmitting signals having the first and second resonant frequencies and the non-resonant frequency toward the resonant object, wherein said receiving step comprises receiving reflected signals having the first and second resonant frequencies and the non-resonant frequency, and wherein said step of reducing signal clutter comprises reducing the smaller of the reflected signals having the first and second resonant frequencies by the magnitude of the reflected signal having the non-resonant frequency.

8. A method according to claim 6 wherein the resonant and non-resonant signals are transmitted from a transmitting location, and wherein said receiving step comprises receiving reflected signals having the resonant frequency and the non-resonant frequency at a third receiving location co-located with the transmitting location.

9. A method according to claim 8 wherein said receiving step comprises receiving reflected signals over time, and wherein said locating step further comprises the steps of:
    generating a respective series of arcs based upon signals received at each of the receiving locations over time, wherein each arc has at least one point representative of a location at which the received signals were reflected; and
    locating the resonant object at an intersection of the respective arcs generated for signals received at each of the receiving locations.

10. A method according to claim 9 wherein said generating step comprises the steps of:
    generating a series of elliptical arcs associated with each of the two spaced apart receiving locations; and
    generating a series of circular arcs associated with the third receiving location co-located with the transmitting location,
    wherein the series of elliptical arcs and circular arcs are spaced further from the respective receiving locations as the time between signal transmission and signal reception increases.

11. A signal processor for locating an object which resonates in response to signals having first and second resonant frequencies, the signal processor comprising:

first and second channels for separately processing reflected signals received over time by first and second receivers, respectively, wherein each channel of said signal processor comprises:

a comparator for comparing reflected signals having the first and second resonant frequencies to identify the signal having a smaller magnitude;

difference means, responsive to said comparator, for reducing the signal having the smaller magnitude by an amount related to the magnitude of a reflected signal having a non-resonant frequency to thereby create an intensity signal having reduced signal clutter; and arc generation means for generating an arc in response to the creation of the intensity signal, wherein the arc has at least one point representative of a location at which the signals having the first and second resonant frequencies were reflected, and wherein the arc is spaced from the respective receiver by a distance relating to the time between signal transmission and signal reception, wherein the resonant object is located at an intersection of the respective arcs generated by said arc generation means of said first and second channels.

12. A signal processor according to claim 11 wherein said arc generation means of each channel generates a series of arcs based upon signals received by the respective receiver over time, and wherein each arc has at least one point representative of a location at which the received signals were reflected.

13. A signal processor according to claim 12 wherein said signal processor further comprises a third channel for processing reflected signals received over time by a third receiver co-located with a transmitter which transmits the first and second resonant signals and the non-resonant signals, wherein said arc generation means of said first and second channels generates a series of elliptical arcs for the first and second receivers, respectively, wherein said arc generation means of said third channel generates a series of circular arcs for the third receiver, and wherein the series of elliptical arcs and circular arcs are spaced further from the respective receivers as the time between signal transmission and signal reception increases.

14. A signal processor according to claim 11 wherein said arc generation means comprises a plotter for plotting the arc generated in response to the creation of the intensity signal.

15. A signal processor according to claim 11 wherein each channel further comprises a threshold comparator, responsive to said difference means, for comparing the magnitude of the intensity signal to a predetermined threshold representative of the minimum acceptable magnitude of an intensity signal based upon a signal which has been reflected by the resonant object.

16. A signal processor according to claim 11 wherein each channel further comprises an amplifier, responsive to said difference means, for selectively amplifying the intensity signal in proportion to the time elapsed between signal transmission and signal reception.

17. A method of locating an object which resonates in response to signals having first and second resonant frequencies, the method comprising the steps of:

separately processing reflected signals received over time by first and second receivers, wherein said separate processing of the reflected signals received over time by each of the first and second receivers comprises the steps of:

comparing reflected signals having the first and second resonant frequencies to identify the signal having a smaller magnitude;

reducing the signal having the smaller magnitude by an amount related to the magnitude of a reflected signal having a non-resonant frequency to thereby create an intensity signal having reduced signal clutter; and generating an arc in response to the creation of the intensity signal, wherein the arc has at least one point representative of a location at which the signals having the first and second resonant frequencies were reflected, and wherein the arc is spaced from the respective receiver by a distance relating to the time between signal transmission and signal reception; and locating the resonant object at an intersection of the respective arcs associated with the first and second receivers.

18. A method according to claim 17 wherein said generating step comprises generating a respective series of arcs based upon signals received by each respective receiver over time, and wherein each arc has at least one point representative of a location at which the received signals were reflected.

19. A method according to claim 18 wherein said step of separately processing reflected signals received over time further comprises separately processing reflected signals received over time by a third receiver co-located with a transmitter which transmits the first and second resonant signals and the non-resonant signals, wherein said step of generating a respective arc for each of the first and second receivers comprises the step of generating a respective series of elliptical arcs for each of the first and second receivers, wherein said step of generating an arc for the third receiver comprises the step of generating a series of circular arcs for the third receiver, and wherein the series of elliptical arcs and circular arcs are spaced further from the respective receivers as the time between signal transmission and signal reception increases.

20. A method according to claim 17 wherein said generating step comprises the step of plotting the arc generated in response to the creation of the intensity signal.

21. A method according to claim 17 wherein said separate processing of the reflected signals received over time by each of the first and second receivers further comprises the step of comparing the magnitude of the intensity signal to a predetermined threshold representative of the minimum acceptable magnitude of an intensity signal based upon a signal which has been reflected by the resonant object.

22. A method according to claim 17 wherein said separate processing of the reflected signals received over time by each of the first and second receivers further comprises the step of selectively amplifying the intensity signal in proportion to the time elapsed between signal transmission and signal reception.

* * * * *